United States Patent
Sato et al.

(10) Patent No.: US 10,211,929 B2
(45) Date of Patent: Feb. 19, 2019

(54) INTRA-BODY COMMUNICATION DEVICE AND METHOD FOR ELIMINATING INTER-FRAME INTERFERENCE BY RANDOMIZING TRANSMISSIONS TIME SLOT ASSIGNMENTS

(71) Applicant: SONY CORPORATION, Tokyo (JP)

(72) Inventors: Masanori Sato, Tokyo (JP); Kentaro Nakahara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/537,675

(22) PCT Filed: Nov. 6, 2015

(86) PCT No.: PCT/JP2015/081257
§ 371 (c)(1),
(2) Date: Jun. 19, 2017

(87) PCT Pub. No.: WO2016/111081
PCT Pub. Date: Jul. 14, 2016

(65) Prior Publication Data
US 2017/0346574 A1   Nov. 30, 2017

(30) Foreign Application Priority Data
Jan. 6, 2015   (JP) .................. 2015-000827

(51) Int. Cl.
*H04B 13/00* (2006.01)
*H04L 5/00* (2006.01)

(52) U.S. Cl.
CPC ........... *H04B 13/005* (2013.01); *H04B 13/00* (2013.01); *H04L 5/0055* (2013.01); *H04L 5/0062* (2013.01)

(58) Field of Classification Search
CPC .... H04B 13/005; H04L 5/0055; H04L 5/0062
See application file for complete search history.

(56) References Cited

U.S. PATENT DOCUMENTS 5,420,864 A * 5/1995 Dahlin ................. H04B 7/2615
370/337
6,040,786 A * 3/2000 Fujioka ................ G06K 7/0008
235/384

(Continued)

FOREIGN PATENT DOCUMENTS

EP   1912339 A1   4/2008
EP   3166276 A1 * 5/2017 ............. G04R 20/18

(Continued)

OTHER PUBLICATIONS

"Close Capacitive Coupling Communication Physical Layer (CCCC PHY)", ECMA International, Standard ECMA-401, 1st Edition, Dec. 2011, 48 pages.

(Continued)

*Primary Examiner* — Devan A Sandiford
(74) *Attorney, Agent, or Firm* — Chip Law Group

(57) ABSTRACT

[Object] To provide a device capable of implementing an extended association procedure that enables compatibility with the existing association procedures. [Solution] Provided is a device including: a determination unit configured to determine whether transmission timing of a first frame received from a communication terminal is a first timing in an intra-body communication system; and a timing decision unit configured to decide timing to transmit a second frame to the communication terminal on the basis of a determination result by the determination unit.

25 Claims, 8 Drawing Sheets

(56) References Cited

U.S. PATENT DOCUMENTS

| | | | |
|---|---|---|---|
| 7,925,215 B2* | 4/2011 | Takayama | G06K 7/10297 340/10.1 |
| 2002/0126687 A1* | 9/2002 | Lindgren | H04B 10/29 370/442 |
| 2006/0002350 A1* | 1/2006 | Behroozi | H04W 36/30 370/338 |
| 2006/0136015 A1* | 6/2006 | Park | A61B 5/0031 607/60 |
| 2006/0203850 A1* | 9/2006 | Johnson | H04W 48/12 370/503 |
| 2007/0147332 A1* | 6/2007 | Lappetelainen | H04W 74/06 370/346 |
| 2009/0275288 A1 | 11/2009 | Fujita et al. | |
| 2010/0062705 A1* | 3/2010 | Rajkotia | H04K 3/224 455/1 |
| 2010/0103870 A1* | 4/2010 | Garcia-Luna-Aceves | H04L 45/306 370/328 |
| 2010/0105324 A1* | 4/2010 | Takayama | G06K 7/0008 455/41.2 |
| 2011/0159816 A1 | 6/2011 | Takayama | |
| 2015/0146654 A1* | 5/2015 | Chu | H04W 72/1289 370/329 |
| 2017/0141952 A1* | 5/2017 | Inohiza | H04L 5/0055 |
| 2018/0048450 A1* | 2/2018 | Raissinia | H04L 5/0055 |

FOREIGN PATENT DOCUMENTS

| | | |
|---|---|---|
| JP | 2003-016554 A | 1/2003 |
| WO | 2008/056416 A1 | 5/2008 |

OTHER PUBLICATIONS

International Search Report and Written Opinion of PCT Application No. PCT/JP2015/081257, dated Feb. 2, 2016, 02 pages of English Translation and 07 pages of ISRWO.

"Close Capacitive Coupling Communication Physical Layer (CCCC PHY)", ECMA-401, 1st Edition, Dec. 2011, pp. 48.

Close Capacitive Coupling Communication Physical Layer (CCCC PHY), ECMA International, Standard ECMA-401, 1st Edition, Dec. 2011, 47 pages.

Extended European Search Report of EP Patent Application No. 15876954.7, issued on Aug. 8, 2018, 10 pages.

"Close Capacitive Coupling Communication Physical Layer (CCCC PHY)", XP 55462239, ECMA International, Standard ECMA-401, 1st Edition, Dec. 2011, 48 pages.

* cited by examiner

INTRA-BODY COMMUNICATION DEVICE AND METHOD FOR ELIMINATING INTER-FRAME INTERFERENCE BY RANDOMIZING TRANSMISSIONS TIME SLOT ASSIGNMENTS

CROSS REFERENCE TO RELATED APPLICATIONS

This application is a U.S. National Phase of International Patent Application No. PCT/JP2015/081257 filed on Nov. 6, 2015, which claims priority benefit of Japanese Patent Application No. JP 2015-000827 filed in the Japan Patent Office on Jan. 6, 2015. Each of the above-referenced applications is hereby incorporated herein by reference in its entirety.

TECHNICAL FIELD

The present disclosure relates to a device, a method, and a computer program.

BACKGROUND ART

For the intra-body communication system, ECMA-401 is developed as the standard specification (Non-Patent Literature 1). In the association procedure defined in this specification, a terminal (Talker) intended to initiate association transmits Association Request1, and a terminal (Listener) serving as an association peer, when receiving it, transmits Association Response1 as reply to the terminal (Talker). The terminal (Talker), when receiving Association Response1, transmits Association Request2 for association verification to the terminal (Listener), the terminal (Listener), when receiving it, transmits Association Response2 as an acknowledgment to the terminal (Talker), and then the association procedure is completed.

In this standard specification, five rates are defined as the sampling rate of the physical layer, each of which is FDC0, 1, 2, 3, and 4. In addition, as the timing rule, a superframe called Time Segment is composed of eight time slots (TDSs). It is defined that each of the frames (Association Request1, Association Request2, Association Response1, and Association Response2) used in the association procedure is performed at the sampling rate called FDC2, and each frame is transmitted in one TDS.

The terminal (Talker) transmits Association Request1 in one TDS selected among TDS0 to 3, on the basis of timing generated by the terminal itself. The TDS number (any one of 0 to 3) transmitted by the terminal (Talker) is described in Association Request1. The terminal (Listener), when receiving Association Request1, can synchronize with the slot timing of the terminal (Talker) on the basis of the described TDS number. Then, the terminal (Listener) transmits Association Response1 to the terminal (Talker) at the timing of +4TDS, which is defined in the specification.

This is applied similarly to Association Request2 and Association Response 2, that is, it is defined that transmission can performed at the timing of +4TDS of the frame received immediately before.

CITATION LIST

Non-Patent Literature

Non-Patent Literature 1: ECMA-401 (1st Edition, December 2011)—Ecma International

DISCLOSURE OF INVENTION

Technical Problem

However, in the association procedure defined in the existing specification, the response timing to Association Request1 is a fixed value (+4TDS), and so, in an environment where a plurality of terminals (Listener) exist, Association Response1 may be transmitted as reply from the plurality of terminals (Listener). Thus, the reception of Association Response1 by the terminal (Talker) at the same timing causes interference, so it is difficult to receive Association Response1.

Further, the ECMA-401 standard is the released specification, and so, a change in functions is necessary to be prevented from adversely affecting a terminal that is capable of being compatible with the existing procedures and is provided in compliance with the existing specifications.

Thus, in the present disclosure, there is provided a novel and improved device, method, and computer program, capable of implementing an extended association procedure that enables compatibility with the existing association procedures.

Solution to Problem

According to the present disclosure, there is provided a device including: a determination unit configured to determine whether transmission timing of a first frame received from a communication terminal is a first timing in an intra-body communication system; and a timing decision unit configured to decide timing to transmit a second frame to the communication terminal on the basis of a determination result by the determination unit.

Further, according to the present disclosure, there is provided a device including: a timing decision unit configured to decide timing to transmit a first frame to establish association with a communication terminal in an intra-body communication system; and a determination unit configured to determine whether a second frame for an acknowledgment from the communication terminal is received. The timing decision unit retransmits the first frame at a different timing on the basis of a determination result by the determination unit.

Furthermore, according to the present disclosure, there is provided a method including: determining whether transmission timing of a first frame received from a communication terminal is a first timing in an intra-body communication system; and deciding timing to transmit a second frame to the communication terminal on the basis of a determination result.

Furthermore, according to the present disclosure, there is provided a computer program for causing a computer to function as a device including: a determination unit configured to determine whether transmission timing of a first frame received from a communication terminal is a first timing in an intra-body communication system; and a timing decision unit configured to decide timing to transmit a second frame to the communication terminal on the basis of a determination result by the determination unit.

Advantageous Effects of Invention

As described above, according to the present disclosure, it is possible to implement the extended association procedure that enables compatibility with the existing association procedures. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
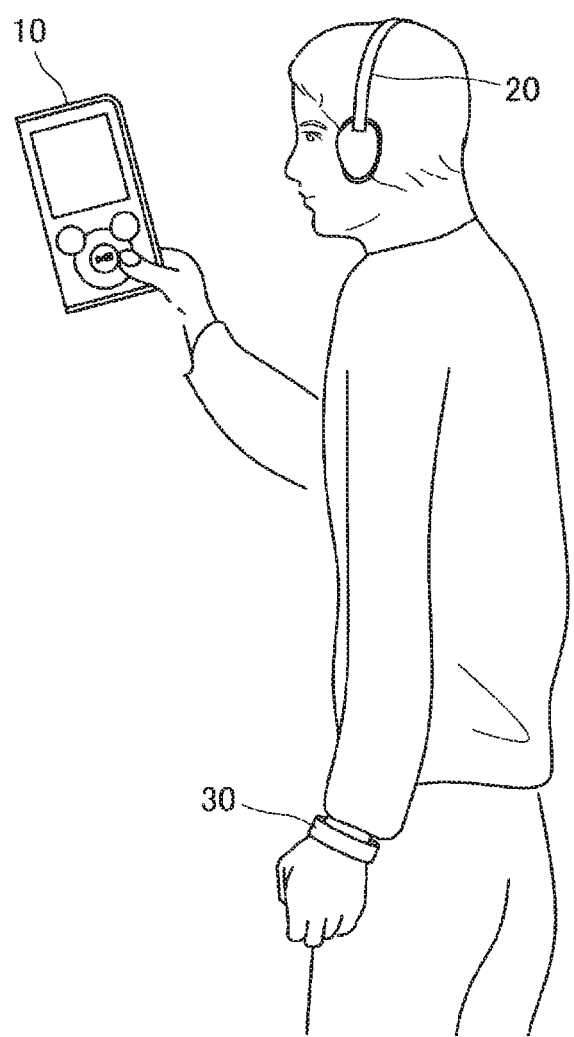
FIG. 1 is a diagram illustrated to describe a situation when communication terminals capable of performing intra-body communication using a human body as a communication medium are associated so that they can transmit and receive information between the communication terminals according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. Association between communication terminals by intra-body communication
2. Functional configuration
3. Association procedure
3.1. Overview of association procedure
3.2. Frame determination processing
(1) Frame format
(2) Processing details
4. Modified example
4.1. Change of MaxTimeSegment
4.2. Setting of flag information
5. Hardware configuration example 1. Association Between Communication Terminals by Intra-Body Communication With reference to FIG. 1, an overview of the association performed by a communication terminal according to an embodiment of the present disclosure is now described. FIG. 1 is a diagram illustrated to describe a situation when communication terminals 10, 20, and 30 capable of performing intra-body communication using a human body as a communication medium are associated so that they can transmit and receive information.

In one example, FIG. 1 illustrates a situation in which a user is operating a music player 10. The music player 10 is equipped with an intra-body communication function. In addition, the user wears a headphone 20 and a wristband wearable terminal 30 as communication terminals equipped with the intra-body communication function. In one example, in the case where it is desired to output music data reproduced by the music player 10 from the headphone 20, it is also possible to output the music data from the music player 10 to the headphone 20 using the intra-body communication function. In this case, the music player 10 and the headphone 20 are associated on the basis of the specification of ECMA-401 so that they can transmit and receive the music data.

Here, the music player 10 serving as the terminal (Talker) that wishes to initiate the association transmits Association Request1, and the headphone 20 serving as the terminal (Listener) that is an association peer, when receiving the Association Request1, transmits Association Response1 as reply to the music player 10. In this case, the wearable terminal 30 can also receive the Association Request1 transmitted from the music player 10, and so the wearable terminal 30 transmits Association Response1 as reply to the music player 10. In accordance with the existing specification of ECMA-401, the terminals (Listeners, e.g. headphone 20 and wearable terminal 30), when receiving Association Request 1, transmits Association Response 1 at the timing after +4TDS from the time slot in which the Association Request 1 is transmitted. Thus, the music player 10 receives Association Response1 from both the headphone 20 and the wearable terminal 30 at the same timing, which causes interference.

Thus, the communication terminal according to the present embodiment performs the association processing to be capable of being compatible with the existing specification of ECMA-401, so that frames can be received reliably by eliminating such inter-frame interference. The functional configuration related to the association processing and the association procedure by the communication terminal according to the present embodiment are described in detail below.

2. Functional Configuration

Figure 2:
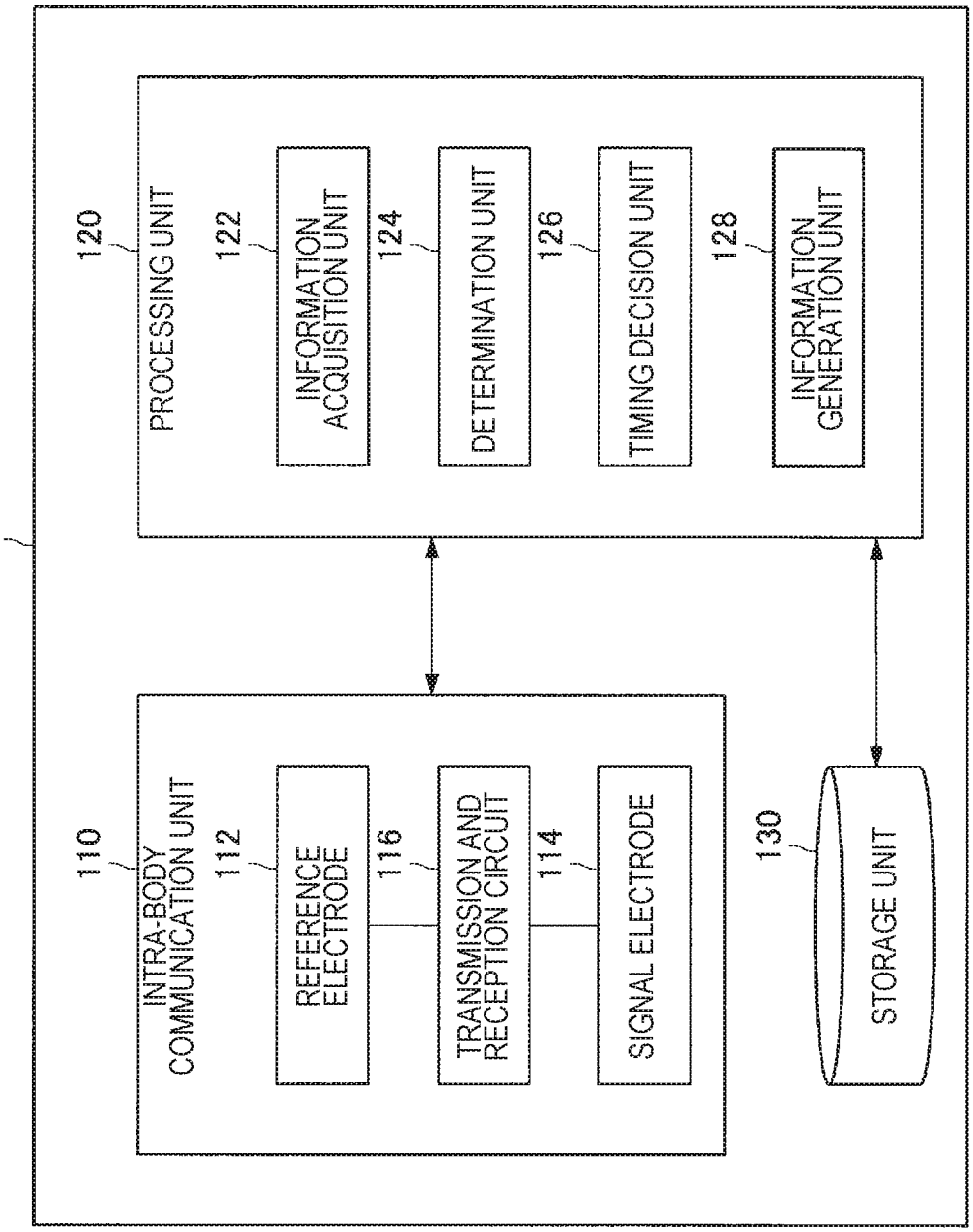
FIG. 2 is a functional block diagram illustrating a functional configuration related to association processing between the communication terminals according to the present embodiment.

With reference to FIG. 2, the functional configuration related to the association processing by a communication terminal 100 according to the present embodiment is described. Note that FIG. 2 is a functional block diagram illustrating the functional configuration related to the association processing by the communication terminal 100 according to the present embodiment.

The communication terminal 100 illustrated in FIG. 2 is a terminal having the intra-body communication function. Examples of the communication terminal 100 include various devices such as a smartphone, a tablet terminal, and an eyewear terminal, in addition to the music player 10, the headphone 20, and the wearable terminal 30 illustrated in FIG. 1. The communication terminal 100 is configured to include an intra-body communication unit 110, a processing unit 120, and a storage unit 130, as illustrated in FIG. 2.

The intra-body communication unit 110 performs communication using a human body as a communication medium with another communication device. The intra-body communication unit 110 is configured to include a communication electrode 114, a reference electrode 112, and a transmission and reception circuit 116, as illustrated in FIG. 2.

The communication electrode 114 electrostatically couples with the human body, and sets the reference electrode 112 as a reference point to transmit and receive a signal for intra-body communication by using a potential difference from the reference point. In one example, the communication electrode 114 transmits the signal received from the transmission and reception circuit 116 to another communication terminal through the human body. In addition, the communication electrode 114 receives a signal from another communication terminal through the human body and supplies it to the transmission and reception circuit 116.

The reference electrode 112 is an electrode serving as a reference point when the transmission and reception circuit 116 acquires a potential difference between the reference electrode 112 and the communication electrode 114. Moreover, in the present embodiment, the intra-body communication unit 110 transmits and receives the signal for intra-body communication on the basis of the potential difference between the communication electrode 114 and the reference electrode 112, but the present disclosure is not limited to such an example. In one example, the signal for intra-body communication may be transmitted and received on the basis of the potential difference between the ground of the circuit, instead of the reference electrode 112, and the communication electrode. In addition, the communication electrode 114 may be used as the reference electrode, and the reference electrode 112 may be used as the communication electrode.

The transmission and reception circuit 116 generates a potential difference between the communication electrode 114 and the reference electrode 112, and performs transmission of the signal for intra-body communication with another communication terminal. The transmission and reception circuit 116 receives the signal transmitted from another communication terminal through the human body, and receives the signal using the potential difference between the communication electrode 114 and the reference electrode 112. In addition, the transmission and reception circuit 116 generates the signal for intra-body communication on the basis of an instruction from the processing unit 120, and transmits the signal to another communication device through the communication electrode 114.

(Processing Unit)

The processing unit 120 performs processing for associating between communication terminals to enable transmission and reception of information between the communication terminals. The processing unit 120 is configured to include an information acquisition unit 122, a determination unit 124, a timing decision unit 126, and an information generation unit 128, as illustrated in FIG. 2.

The information acquisition unit 122 acquires information received through the intra-body communication unit 110. The information acquired by the information acquisition unit 122 is output to the determination unit 124.

The determination unit 124 performs determination processing for obtaining information necessary to decide processing to be executed. In one example, in the case where the communication terminal 100 functions as a terminal (Talker) that wishes to initiate association, the determination unit 124 determines whether Association Response1 is received from the association peer as an acknowledgment to the transmitted Association Request1. Additionally, in one example, in the case where the communication terminal 100 functions as a terminal (Listener) that is the association peer, the determination unit 124 determines whether the transmission timing of the received Association Request1 is the timing based on the existing specification. The determination result obtained by the determination unit 124 is output to the timing decision unit 126.

The timing decision unit 126 decides timing to transmit the information on the basis of the determination result obtained by the determination unit 124. In one example, in the case where the communication terminal 100 functions as a terminal (Talker) that wishes to initiate association, the transmission timing of Association Request1 is decided. In this case, in the case where Association Response1 fails to be received from the association peer as an acknowledgment to the transmitted Association Request1, the timing decision unit 126 decides again the transmission timing of Association Request1 on the basis of the determination result.

Further, in one example, in the case where the communication terminal 100 functions as a terminal (Listener) that is the association peer, the timing decision unit 126 decides the transmission timing of Association Response1 that is an acknowledgment to Association Request1 on the basis of the determination result. The processing result by the timing decision unit 126 is output to the information generation unit 128.

The information generation unit 128 generates information to be transmitted to another communication terminal. The information generated by the information generation unit 128 is transmitted to the other communication terminal through the intra-body communication unit 110.

(Storage Unit)

The storage unit 130 temporarily or permanently stores a program and data for the operation of the communication terminal 100.

The functional configuration related to the association processing by the communication terminal 100 according to the present embodiment has been described above.

3. Association Procedure

Next, the association procedure between the communication terminals having the intra-body communication function is described.

(3.1. Overview of Association Procedure)

Figure 3:
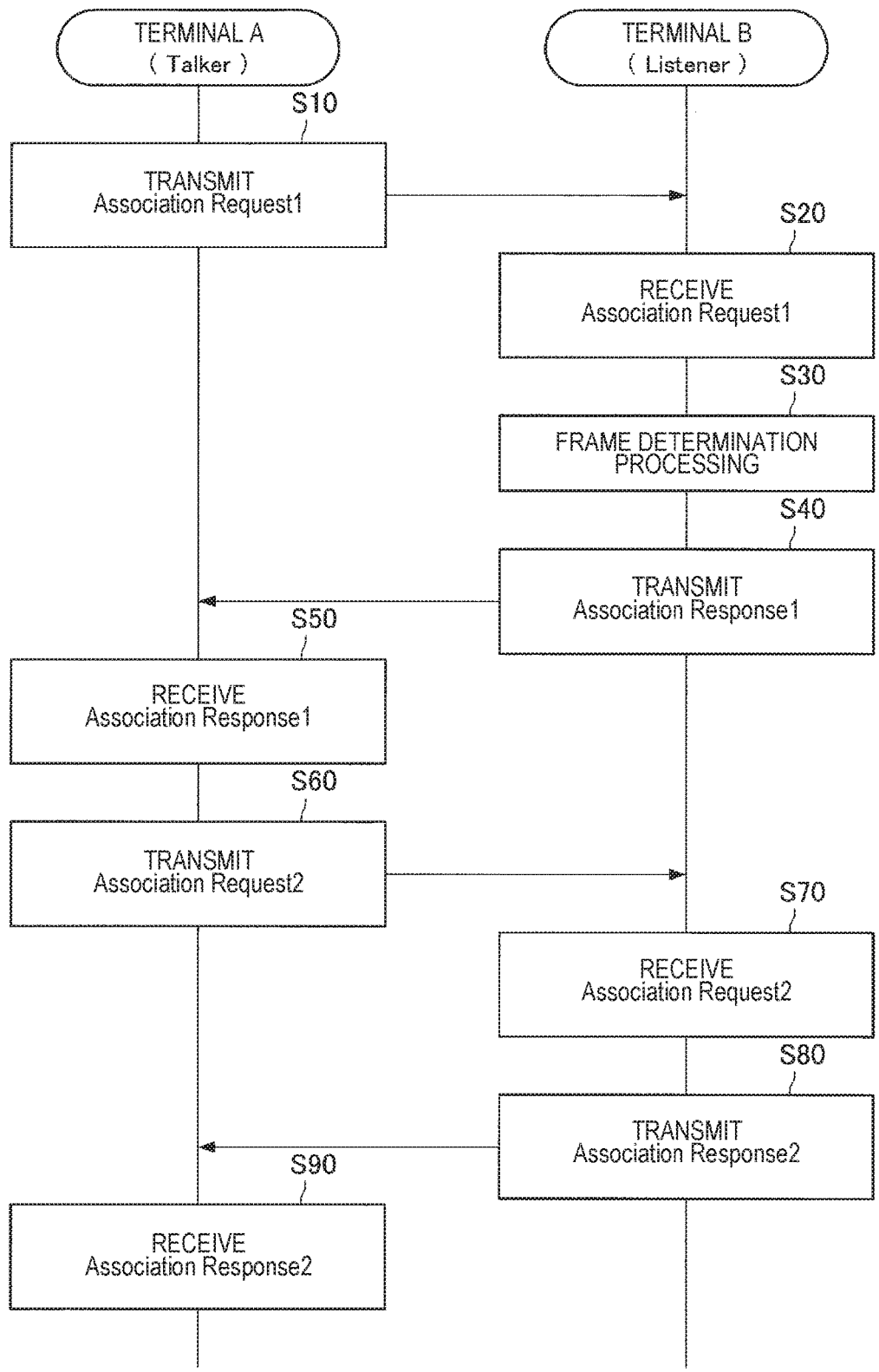
FIG. 3 is a timing chart illustrating an overview of the association procedure between communication terminals, each having an intra-body communication function.

With reference to FIG. 3, an overview of the association procedure between the communication terminals having the intra-body communication function according to the present embodiment is described. FIG. 3 is a timing chart illustrating an overview of the association procedure between the communication terminals having the intra-body communication function.

The association procedure illustrated in FIG. 3 is based on the specification of ECMA-401 (Non-Patent Literature 1). In FIG. 3, a terminal A is set to a terminal (Talker) that wishes to initiate association, and a terminal B is set to a terminal (Listener) that is the association peer of the terminal A.

In the association procedure defined in this specification, the terminal A that wishes to initiate the association transmits Association Request1 that is a first frame (S10). The terminal B, when receiving Association Request1 (S20), performs frame determination processing on the received Association Request1 (S30). In the frame determination processing, as in the existing specification, processing for deciding the transmission timing of Association Response1 that is a second frame to be transmitted by the terminal B as an acknowledgment is performed, in addition to the processing for verifying the time slot number of Association Request1. Note that the details of the frame determination processing will be described later.

The terminal B, when deciding the transmission timing of Association Response1 to be transmitted as an acknowledgment, transmits Association Response1 at the decided timing (S40). The terminal A, when receiving Association Response1 (S50), transmits Association Request2 that is a third frame for association verification to the terminal B (S60). The terminal B, when receiving Association Request2 (S70), transmits Association Response2 that is a fourth frame to the terminal A as an acknowledgment (S80). Then, the terminal A receives Association Response2, and then the association procedure is completed (S90).

(3.2. Frame Determination Processing)

Figure 4:
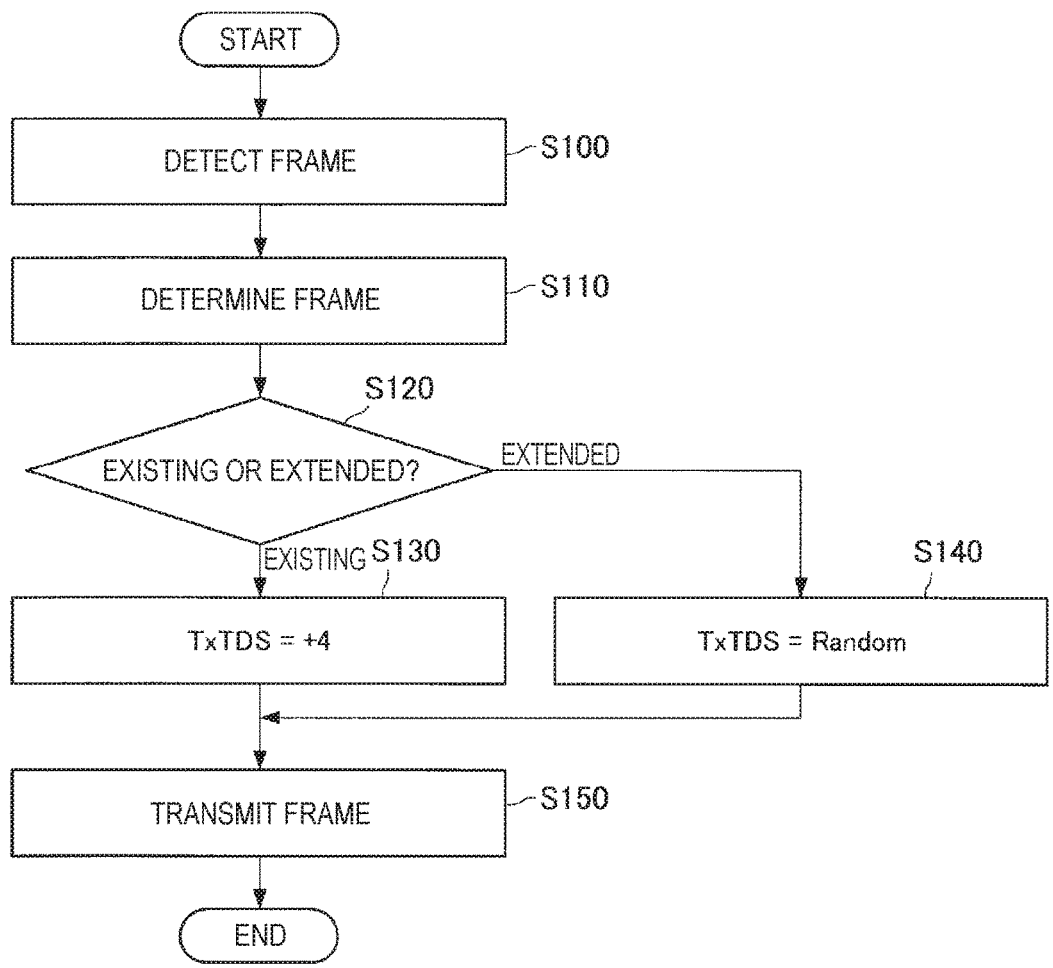
FIG. 4 is a flowchart illustrating frame determination processing according to the present embodiment.
Figure 5:
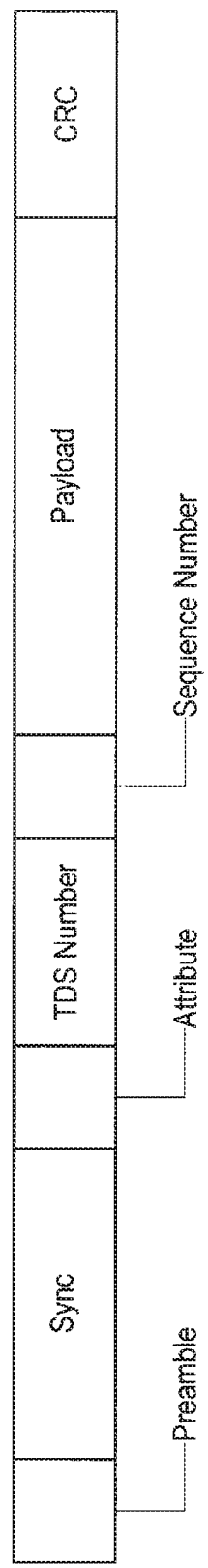
FIG. 5 is a diagram illustrated to describe a frame format.
Figure 6:
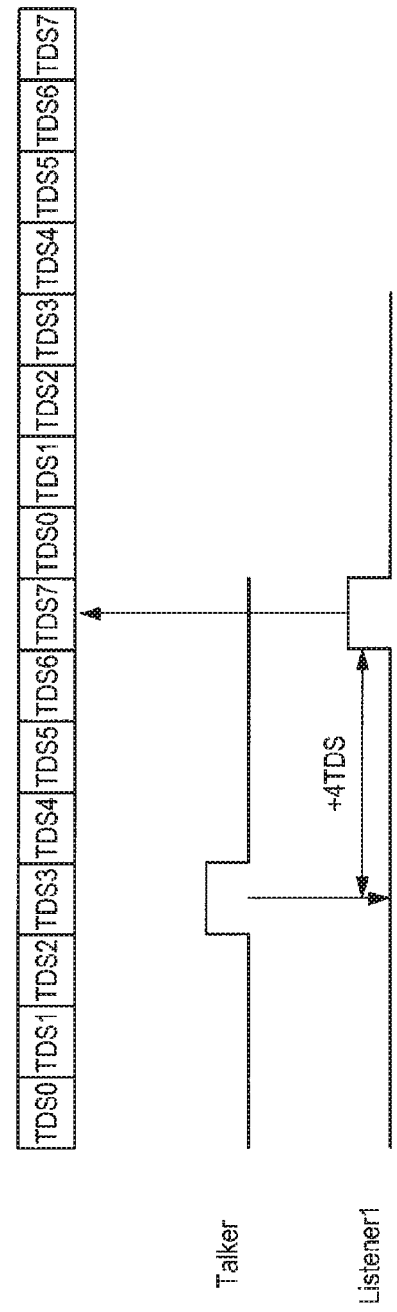
FIG. 6 is a diagram illustrated to describe frame transmission at the existing timing.
Figure 7:
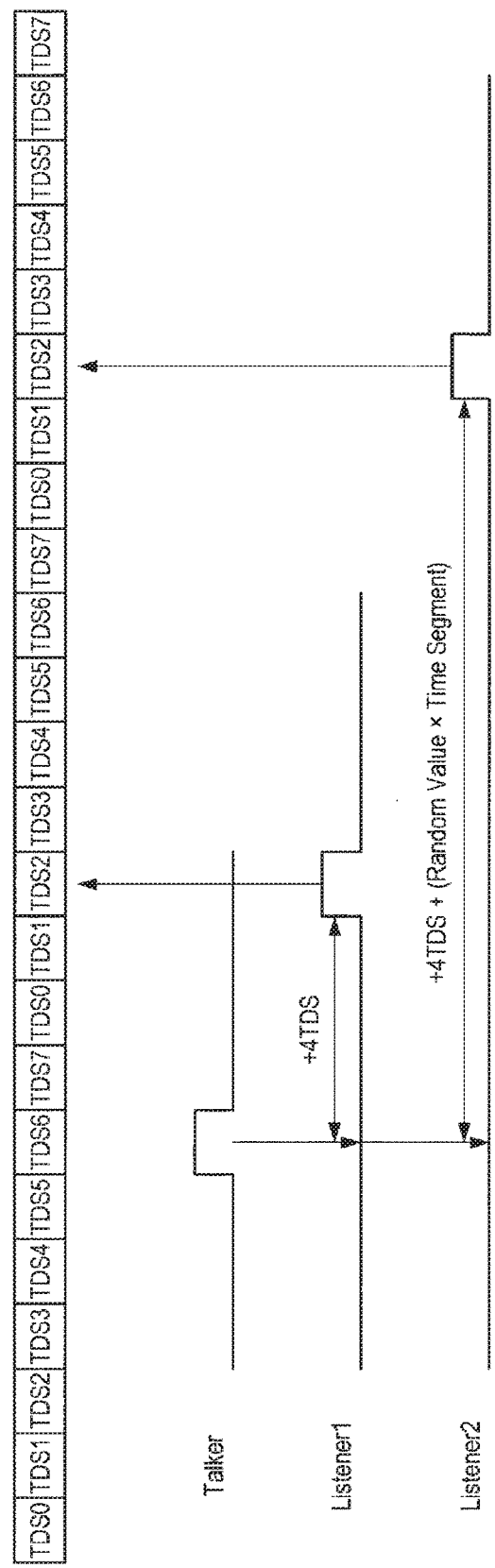
FIG. 7 is a diagram illustrated to describe frame transmission at an extended timing.

Next, the frame determination processing in step S30 of FIG. 3 is described in detail with reference to FIGS. 4 to 7. Moreover, FIG. 4 is a flowchart illustrating the frame determination processing according to the present embodiment. FIG. 5 is a diagram illustrated to describe a frame format. FIG. 6 is a diagram illustrated to describe frame transmission at the existing timing. FIG. 7 is a diagram illustrated to describe frame transmission at the extended timing.

(1) Frame Format

Prior to the description of the frame determination processing, the configuration of frames (Association Request1, Association Request2, Association Response1, and Association Response2) transmitted between communication terminals at the time of communication association is described with reference to FIG. 5. The frame illustrated in FIG. 5 is composed of Preamble, Sync, Attribute, Sequence Number, TDS Number, Payload, and CRC.

Preamble and Sync are the fixed patterns used for a communication terminal to perform packet detection and frame synchronization when the communication terminal functions as a receiver.

Attribute and Sequence Number indicate the type of transmission frame by a combination thereof.

TDS Number is the TDS number of a transmitter in transmitting the relevant frame.

Payload is data to be transmitted by the transmitter. For the association request frames (Association Request1, Association Request2, Association Response1, and Association Response2) described in the present disclosure, the contents of them are defined in the specification of ECMA-401. For a data frame, data of the upper layer is described.

CRC is used for error detection of a frame.

(2) Processing Details

With reference to FIG. 4, the frame determination processing according to the present embodiment is described. FIG. 4 illustrates processing on the side of the terminal (Listener) that is the association peer. In the following description, the terminal (Talker) that wishes to initiate the association is set as a terminal A, and a terminal (Listener) that is the association peer of the terminal A is set as a terminal B, which is similar to the case of FIG. 3.

As illustrated in FIG. 4, the terminal B that is the association peer of the terminal A, when detecting that Association Request1 is received as an association request from the terminal A (S100), determines the transmission timing of the transmitted frame on the basis of the frame received by the determining unit 124 (S110).

Here, the terminal A, which is the communication terminal according to the present embodiment, can transmit Association Request1 at the timing based on the specification of ECMA-401, or can transmit it in a manner compatible with the specification of ECMA-401 at timing different from that of the specification. The timing at which the terminal A transmits Association Request1 may be set previously. Alternatively, in the case where Association Request1 is transmitted at the existing timing based on the specification and then the acknowledgment (Association Response1) to the Association Request1 is not received, the Association Request1 may be transmitted again at timing other than the existing timing. In this event, in the case where the acknowledgment (Association Response1) to the Association Request1 is not received even if the Association Request1 is transmitted at the timing other than the existing timing, the Association Request1 may be repeatedly transmitted at the timing other than the existing timing until the receipt of the acknowledgment.

In one example, assume that the terminal A transmits Association Request1 at the existing timing. In this case, the terminal A transmits Association Request1 at one timing of time slots TDS0 to TDS3 on the basis of the specification of ECMA-401. In one example, as illustrated in FIG. 6, assume that the terminal A transmits Association Request1 in time slot TDS3. In this case, Attribute, TDS Number, and Sequence Number of the Association Request1 have the following contents.

Attribute=(00)b
TDS Number=(011)b
Sequence Number=(00)b

Further, in the above, (00)b is a bit expression. In one example, (011)b of TDS Number indicates three bits, and it's value is 3. Attribute and Sequence Number are set to the value defined in the existing specification. In other words, Attribute and Sequence Number are set to zero.

Further, in one example, assume that the terminal A transmits Association Request1 at the timing other than the existing timing (hereinafter also referred to as "extended timing"). In this case, the terminal A transmits Association Request1 at the timing other than the time slots TDS0 to TDS3 defined in the specification of ECMA-401. In other words, the terminal A transmits Association Request1 at one timing of the time slots TDS4 to TDS7. In one example, as illustrated in FIG. 7, assume that the terminal A transmits Association Request1 in the time slot TDS6. In this case, Attribute, TDS Number, and Sequence Number of the Association Request1 have the following contents.

Attribute=(00)b
TDS Number=(110)b
Sequence Number=(00)b

TDS Number is set to 6. Attribute and Sequence Number are set to 0 as defined in the existing specification. In other words, only TDS Number differs between Association Request1 transmitted at the existing timing and Association Request1 transmitted at the extended timing.

The terminal B, when receiving the frame, performs error determination using CRC. If it is determined that the reception is successful without error, the terminal B determines the type of the frame received by the determination unit 124. The type of the frame is performed using Attribute, TDS Number, and Sequence Number of the received frame.

In one example, the determination of whether the frame is Association Request1 transmitted at the existing timing is performed by determining whether the following determination condition of Association Request1 is satisfied. Moreover, the determination of TDS Number is performed by verifying that TDS Number is one of 0 to 3. This is because TDS Number of Association Request1 transmitted by the terminal A is limited to one of 0 to 3 in the existing specification.

Attribute=(00)b
(000)b≤TDS Number≤(011)b
Sequence Number=(00)b

Further, in one example, the determination of whether Extended Association Request1 is transmitted at the extended timing is performed by determining whether the following determination condition of Extended Association Request1 is satisfied. Furthermore, the determination of the TDS Number is performed by verifying that the TDS Number is one of 4 to 7. This is because TDS Number of Extended Association Request1 transmitted by the terminal A is limited to one of 4 to 7 in the extended association procedure.

Attribute=(00)b
(100)b≤TDS Number≤(111)b
Sequence Number=(00)b

Referring back to the description with reference to FIG. 4, in step S110, the determination unit 124 determines the received frame as described above. Then, the timing decision unit 126 determines whether the timing to transmit an acknowledgment to the received frame is set to the existing timing or the extended timing, on the basis of the determination result in step S110 (S120).

In one example, in the case where the received frame satisfies the above-described determination condition of Association Request1, the timing decision unit 126 decides to transmit Association Response1 that is an acknowledgment at the existing timing. On the other hand, in the case where the received frame satisfies the above-described determination condition of Extended Association Request1, the timing decision unit 126 decides to transmit Association Response1 that is an acknowledgment at the extended timing.

If the timing to transmit the frame of an acknowledgment (Association Response1) is decided in step S120, the timing decision unit 126 calculates which time slot is to be used.

In the case of transmitting Association Response1 at the existing timing, Association Response1 is transmitted as reply after four TDSs from the timing at which Association Request1 is received, on the basis of the specification of ECMA-401 (S130). In one example, in the example illustrated in FIG. 6, Association Request1 is received in TDS3, and so Association Response1 is transmitted in TDS7. The following contents are set in Association Response1.

Attribute=(00)b
TDS Number=(111)b
Sequence Number=(01)b

On the other hand, in the case where Extended Association Response1 is transmitted at the extended timing, the timing decision unit 126 decides the timing, TxTDS, to transmit Extended Association Response1, on the basis of the following Equation (1) (S140).

[Math. 1]

$$TxTDS = a + b \times \lfloor RandomNumber \times MaxTimeSegment \rfloor \quad (1)$$

In this Equation, a is the number of time slots of the existing timing and is set to 4. In this Equation, b is a predetermined constant, and in one example, the number of slots that constitutes a superframe Moreover, the constant b may be any value from 1 to 8. RandomNumber is a uniform random number in the range of [0-1]. In addition, MaxTimeSegment is a predetermined constant, and is set to, for example, 8. The product of RandomNumber and MaxTimeSegment is rounded to be an integer.

In one example, in the case where a is set to 4, b is set to 8, MaxTimeSegment is set to 8, and RandomNumber is 0.2, the timing, TxTDS, to transmit Extended Association Response1 is 12, which is given by Equation (1). Thus, Extended Association Response1 is transmitted as reply after 12 TDSs from the timing at which Extended Association Request1 is received. In one example, in the example illustrated in FIG. 7, Association Request1 is received in TDS6, and so the transmission of Extended Association Response1 is TDS2 of the superframe after two cycles.

As illustrated in FIG. 7, RandomNumber differs for each terminal (Listener) that is the association peer, so the timing to transmit Extended Association Response1 also differs. Thus, it can be expected that the terminal A can receive the frame of the acknowledgment from the terminal (Listener) that is the association peer without interference.

Referring back to the description with reference to FIG. 4, if the timing to transmit Association Response1 from the terminal B to the terminal A is decided in step S130 or S140, the information generation unit 128 generates the contents of the frame. The generated frame is transmitted to the terminal A through the intra-body communication unit 110 (S150). If the terminal B transmits Association Response1 and then the terminal A receives the Association Response1 as illustrated in FIG. 3 (S50), the terminal A transmits Association Request2 to the terminal B to verify the association (S60). The terminal B, when receiving Association Request2 (S70), transmits Association Response2 to the terminal A as an acknowledgment (S80). Then, when the terminal A receives the Association Response2, the association procedure is completed (S90).

The association procedure between the communication terminals having the intra-body communication function according to the present embodiment has been described above. This processing makes it possible for the terminal (Talker) to receive frames of the plurality of terminals (Listener) without interference by shifting the transmission timing of the frames even when there are the plurality of terminals (Listeners) to be associated with the terminal (Talker) that makes an association request. In this case, it is possible to be compatible with the existing procedures without adversely affecting the terminal that is provided in compliance with the existing specification. In addition, it is not necessary for the terminal (Listener) to recognize the transmission timing previously, and the terminal can be applied to any association procedure.

4. Modified Example (4.1. Change of MaxTimeSegment)

In the case of transmitting at the timing when the terminal (Listener) that is the association peer extends the frame of the acknowledgment in step S140 of FIG. 4, the timing decision unit 126 decides the timing, TxTDS, to transmit Extended Association Response1, on the basis of Equation (1). Here, in Equation (1), MaxTimeSegment may be a fixed constant or a variable constant.

In the case where MaxTimeSegment is a variable constant, the value of MaxTimeSegment may be described, for example, in Payload of Extended Association Request1. In this case, in one example, the value of MaxTimeSegment may be set sequentially from a small value to a large value. More specifically, in the case where MaxTimeSegment is set to a small value and so Extended Association Response1 fails to be transmitted successfully (e.g., the case where CRC is NG), the association processing may be performed again by increasing the value of MaxTimeSegment.

In the case where there are a small number of terminals (Listener) around the terminal (Talker), the frame to be transmitted from the terminal (Listener) is less likely to interfere even if MaxTimeSegment is set to a small value. On the other hand, in the case where Extended Association Response1 fails to be received successfully, the reply timing from a large number of terminals (Listener) around the terminal (Talker) is likely to be overlapped and to cause interference. Thus, in the case where the frame fails to be received successfully, the reply timing of the frames from the terminals (Listener) is prevented from being overlapped by gradually increasing the value of MaxTimeSegment, thereby enabling successful reception of the frames being transmitted from the terminals (Listener).

(4.2. Setting of Flag Information)

Further, in step S110 of FIG. 4, the terminal (Listener) determines the frame Association Request1 transmitted from the terminal (Talker), and decides the timing to transmit the frame of an acknowledgment on the basis of the value of TDS Number. Here, flag information, which is used to determine whether the terminal (Listener) serving as a receiver can transmit the frame of the acknowledgment at the extended timing, may be set in the frame, Association Request1 or Association Request2, transmitted from the terminal (Talker).

The flag information may be set, for example, as one-bit information in Payload of Association Request1 or Association Request2. In one example, if the flag information is 1, it is possible to transmit the frame at the extended timing, but if the flag information is 0, transmission of the frame at the extended timing is prohibited and the frame is to be transmitted at the existing timing.

The setting of the flag information as the information used to decide the frame transmission timing in Association Request1 makes it possible for the terminal that receives Association Request1 to determine easily the timing to transmit Association Response1. In this way, examples of the case where the terminal (Listener) is to transmit a frame at the existing timing include a case where one-to-one communication, such as user authentication at the gate, is desirable to be performed reliably.

Further, as illustrated in FIG. 3, the terminal A, when receiving Association Response1 (S50), transmits Association Request2 for association verification to the terminal B (S60). The terminal B, when receiving Association Request2 (S70), transmits Association Response2 as an acknowledgment to the terminal A (S80). Here, the terminal B receives Association Request2 in step S70, and then may decide the timing to transmit Association Response2 in step S80, on the basis of the value of TDS Number as illustrated in FIG. 4. Alternatively, it may be determined whether to transmit the frame at the timing in which Association Response2 is extended, on the basis of the flag information included in Association Request2 received from terminal A.

The terminal A, which receives Association Response1, can verify whether the timing at which transmission or reception of information between the terminal A and the terminal B is performed is the existing timing or the extended timing from the reception timing. Thus, the terminal A, which accepts the reception of the Association Response1, decides the transmission timing of Association Request2 to be transmitted as the association verification to be one of the existing timing or the extended timing, and sets the flag information. In one example, the flag information is set to 1 for the case where the frame is transmitted to the terminal B at the extended timing, but the flag information is set to 0 for the case where the frame is transmitted to the terminal B at the existing timing. In this way, the setting of the flag information as the information used to decide the frame transmission timing makes it possible for the terminal, which receives the frame, to determine the transmission timing easily.

5. Hardware Configuration Example

Figure 8:
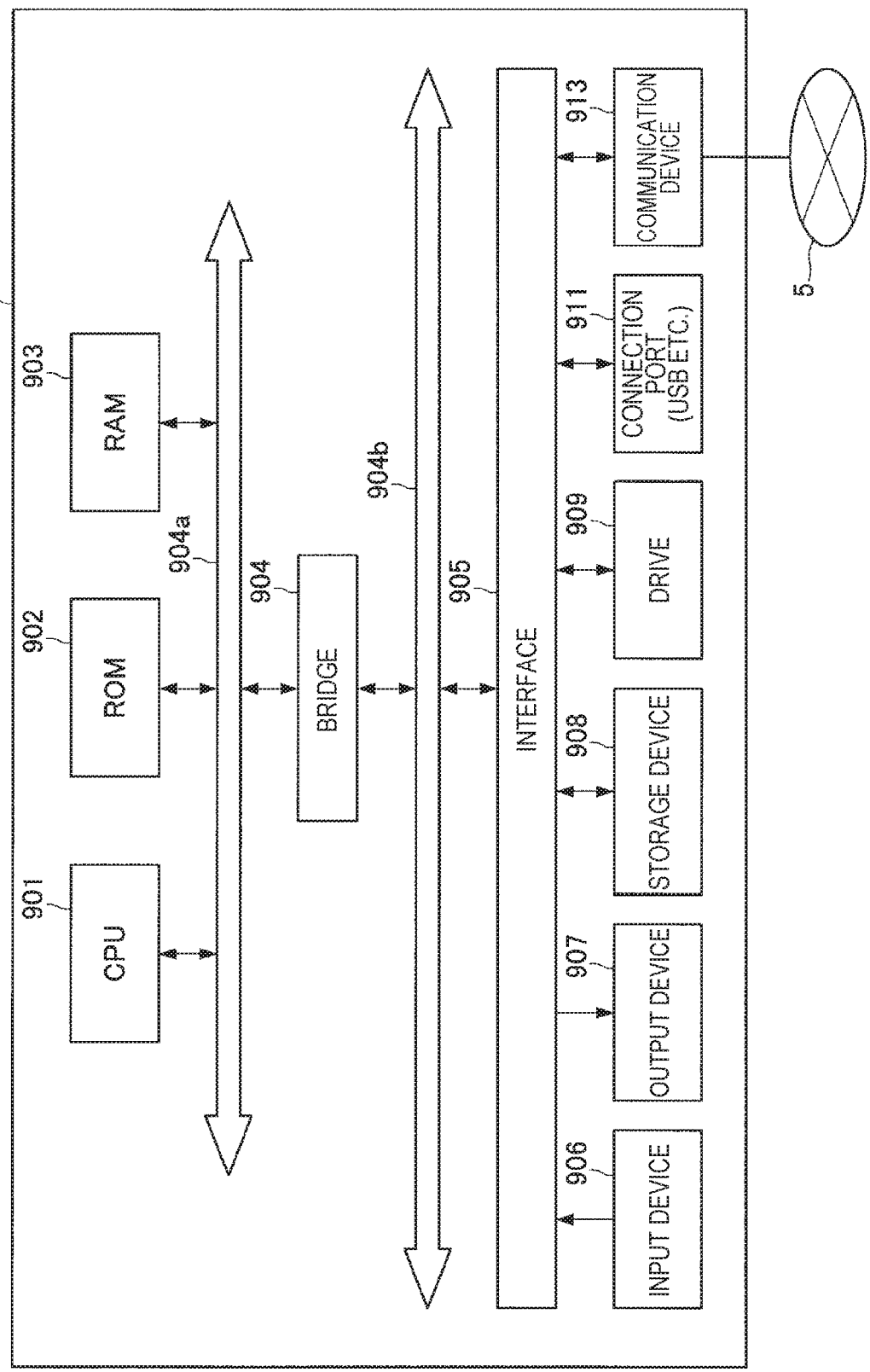
FIG. 8 is a hardware configuration diagram illustrating a hardware configuration of a processing unit.

A hardware configuration example of the communication terminal 100 according to the present embodiment is described. FIG. 8 is a hardware configuration diagram illustrating a hardware configuration of the communication terminal 100 according to the present embodiment.

The communication terminal 100 according to the present embodiment can be implemented as a processing device such as a computer. As illustrated in FIG. 8, the communication terminal 100 is configured to include a central processing unit (CPU) 901, read only memory (ROM) 902, random access memory (RAM) 903, and a host bus 904a. Furthermore, the communication terminal 100 is configured to include a bridge 904, an external bus 904b, an interface 905, an input device 906, an output device 907, a storage device 908, a drive 909, a connection port 911, and a communication device 913.

The CPU 901 functions as an arithmetic processing unit and a controller and controls the overall operation in the communication terminal 100 in accordance with various programs. Furthermore, the CPU 901 may be a microprocessor. The ROM 902 stores, for example, programs or operation parameters used by the CPU 901. The RAM 903 temporarily stores programs used in the execution by the CPU 901 and stores the parameters and the like that appropriately changes during the execution. These components are interconnected via the host bus 904a composed of a CPU bus.

The host bus 904a is connected to the external bus 904b, such as a peripheral component interconnect/interface (PCI) bus, through the bridge 904. Moreover, the host bus 904a, the bridge 904, and the external bus 904b are not necessarily configured as separate components, and the functions of them may be implemented in a single bus.

The input device 906 is configured to include input means through which the user can input information and an input control circuit that generates an input signal on the basis of the input by the user and outputs it to the CPU 901. Examples of the input means include a mouse, a keyboard, a touch panel, a button, a microphone, a switch, and a lever. The output device 907 includes, for example, a display device such as a liquid crystal display (LCD) device, an organic light emitting diode (OLED) device, or a lamp, and a speech output device such as a loudspeaker.

The storage device 908 is an example of the storage unit of the communication terminal 100 and is a device for storing data. The storage device 908 may include a recording medium, a recording device that records data in the recording medium, a readout device that reads out data from the recording medium, and a deletion device that deletes data recoded in the recording medium. The storage device 908 drives a hard disk and stores programs that the CPU 901 executes and various kinds of data.

The drive 909 is a reader-writer for a recording medium, and is built-in the communication terminal 100 or is externally attached. The driver 909 reads out information recorded in a magnetic disk, an optical disk, or a magneto-optical disc that is mounted thereto or a removable storage medium such as a semiconductor memory, and outputs the information to the RAM 903.

The connection port 911 is an interface connected to an external device and is a port for connecting an external device that is capable of transmitting data through, for example, a universal serial bus (USB). Furthermore, the communication device 913 is, for example, a communication interface composed of a communication device or the like for connecting to a communication network 5. Furthermore, the communication device 913 may be a communication device compatible with a wireless local area network (LAN), a communication device compatible with a wireless USB, or a wired communication device that communicates with wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, in the above description, the processing unit 120 (device) of the communication terminal 100 is described as a module installed in a communication terminal, but the processing unit 120 may be implemented as a computer program for causing a processor (e.g., CPU and DSP) to function as a component of the above device. In addition, a recording medium on which the computer program is recorded may also be provided. In addition, there may also be provided a device including a memory that stores the computer program and one or more processors capable of executing the computer program. In addition, a method including the operation of the components of the device is also included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A device including:
a determination unit configured to determine whether transmission timing of a first frame received from a communication terminal is a first timing in an intra-body communication system; and
a timing decision unit configured to decide timing to transmit a second frame to the communication terminal on the basis of a determination result by the determination unit.

(2)
The device according to (1),
in which the timing decision unit decides the timing to transmit the second frame using a random value when the first frame is determined to be transmitted at timing other than the first timing.

(3)
The device according to (2),
in which the timing decision unit decides the timing, TxTDS, to transmit the second frame using the random value on the basis of Equation below:

$$TxTDS = a + b \times \lfloor RandomNumber \times MaxTimeSegment \rfloor \quad [\text{Math. 2}]$$

where a is the number of time slots of the first timing, b is a predetermined constant, RandomNumber is a uniform random number in a range of [0-1], and MaxTimeSegment is a predetermined constant.

(4)
The device according to (3),
in which the MaxTimeSegment is a variable constant.

(5)
The device according to (4),
in which the MaxTimeSegment is changed from a small value to a large value.

(6)
The device according to any one of (1) to (5),
in which the first frame includes flag information used to define the timing to transmit the second frame, and
the timing decision unit decides the timing to transmit the second frame on the basis of the flag information included in the received first frame.

(7)
The device according to any one of (1) to (6),
in which each of the frames has a frame format based on ECMA-401 standard.

(8)
The device according to (7),
in which the determination unit
determines that the first frame is transmitted at the first timing when TDS Number in the frame format of the first frame is TDS0 to 3, and
determines that the first frame is transmitted at timing other than the first timing when TDS Number in the frame format of the first frame is TDS4 to 7.

(9)
A device including:
a timing decision unit configured to decide timing to transmit a first frame to establish association with a communication terminal in an intra-body communication system; and
a determination unit configured to determine whether a second frame for an acknowledgment from the communication terminal is received,
in which the timing decision unit retransmits the first frame at a different timing on the basis of a determination result by the determination unit.

(10)
A method including:
determining whether transmission timing of a first frame received from a communication terminal is a first timing in an intra-body communication system; and
deciding timing to transmit a second frame to the communication terminal on the basis of a determination result.

(11)
The method according to (10),
in which the timing to transmit the second frame is decided using a random value when the first frame is determined to be transmitted at timing other than the first timing.

(12)
The method according to (11),
in which the timing, TxTDS, to transmit the second frame is decided using the random value on the basis of Equation below:

$$TxTDS = a + b \times \lfloor RandomNumber \times MaxTimeSegment \rfloor \quad [\text{Math. 3}]$$

where a is the number of time slots of the first timing, b is a predetermined constant, RandomNumber is a uniform random number in a range of [0-1], and MaxTimeSegment is a predetermined constant.

(13)
The method according to (12),
in which the MaxTimeSegment is a variable constant.

(14)
The method according to (13),
in which the MaxTimeSegment is changed from a small value to a large value.

(15)
The method according to any one of (10) to (14),
in which the first frame includes flag information used to define the timing to transmit the second frame, and the timing to transmit the second frame is decided on the basis of the flag information included in the received first frame.

(16)

The method according to any one of (10) to (15), in which each of the frames has a frame format based on ECMA-401 standard.

(17)

The method according to (16), in which the first frame is determined to be transmitted at the first timing when TDS Number in the frame format of the first frame is TDS0 to 3, and the first frame is determined to be transmitted at timing other than the first timing when TDS Number in the frame format of the first frame is TDS4 to 7.

(18)

The method according to any one of (10) to (17), in which whether the second frame for an acknowledgment from the communication terminal is received is determined, and the first frame is retransmitted at timing different from a previous timing in a case where the second frame is not received.

(19)

A computer program for causing a computer to function as a device including:

a determination unit configured to determine whether transmission timing of a first frame received from a communication terminal is a first timing in an intra-body communication system; and a timing decision unit configured to decide timing to transmit a second frame to the communication terminal on the basis of a determination result by the determination unit.

(20)

A device including:

a timing decision unit configured to decide, on the basis of flag information included in a first frame received from a communication terminal, timing to transmit a second frame to the communication terminal in an intra-body communication system, the flag information being used to define the timing to transmit the second frame to the communication terminal.

(21)

The device according to (20), in which the timing decision unit decides the timing to transmit the second frame on the basis of a first timing at which the first frame is transmitted when the flag information is off, and decides the timing to transmit the second frame using a random value when the flag information is on.

(22)

The device according to (21), in which the timing decision unit decides the timing, TxTDS, to transmit the second frame using the random value on the basis of Equation below:

$$TxTDS=a+b\times \lfloor RandomNumber\times MaxTimeSegment \rfloor \quad [\text{Math. 4}]$$

where a is the number of time slots of the first timing, b is a predetermined constant, RandomNumber is a uniform random number in a range of [0-1], and MaxTimeSegment is a predetermined constant.

(23)

The device according to (22), in which the MaxTimeSegment is a variable constant.

(24)

The device according to (23), in which the MaxTimeSegment is changed from a small value to a large value.

(25)

The device according to any one of (20) to (24), in which each of the frames has a frame format based on ECMA-401 standard.

(26)

A method including:

deciding, on the basis of flag information included in a first frame received from a communication terminal, timing to transmit a second frame to the communication terminal in an intra-body communication system, the flag information being used to define the timing to transmit the second frame to the communication terminal.

(27)

The method according to (26), in which the timing to transmit the second frame is decided on the basis of a first timing at which the first frame is transmitted when the flag information is off, and the timing to transmit the second frame is decided using a random value when the flag information is on.

(28)

The method according to (27), in which the timing, TxTDS, to transmit the second frame is decided using the random value on the basis of Equation below:

$$TxTDS=a+b\times \lfloor RandomNumber\times MaxTimeSegment \rfloor \quad [\text{Math. 5}]$$

where a is the number of time slots of the first timing, b is a predetermined constant, RandomNumber is a uniform random number in a range of [0-1], and MaxTimeSegment is a predetermined constant.

(29)

The method according to (28), in which the MaxTimeSegment is a variable constant.

(30)

The method according to (29), in which the MaxTimeSegment is changed from a small value to a large value.

(31)

The method according to any one of (26) to (30), in which each of the frames has a frame format based on ECMA-401 standard.

(32)

The method according to any one of (26) to (31), in which whether the second frame for an acknowledgment from the communication terminal is received is determined, and the first frame is retransmitted at timing different from a previous timing in a case where the second frame is not received.

(33)

A computer program for causing a computer to function as a device including:

a timing decision unit configured to decide, on the basis of flag information included in a first frame received from a communication terminal, timing to transmit a second frame to the communication terminal in an intra-body communication system, the flag information being used to define the timing to transmit the second frame to the communication terminal.

The invention claimed is:

1. A device, comprising:
circuitry configured to:
receive a first frame from a communication terminal in an intra body communication system, wherein the first frame comprises a Time Slot (TDS) Number in a frame format based on ECMA-401 standard;
a determine a transmission timing of the first frame is a first timing based on the TDS Number of the first frame that is TDS0 to TDS3;
determine the transmission timing of the first frame is a second timing, other than the first timing, based on the TDS Number of the first frame that is TDS4 to TDS7; and
determine a third timing to transmit a second frame to the communication terminal based on the transmission timing of the first frame.

2. The device according to claim 1, wherein the circuitry is configured to determine the third timing by a random value based on the transmission timing that is the second timing.

3. The device according to claim 2, wherein the circuitry is configured to determine the third timing by the random value based on Equation below:

$$TxTDS = a + b \times \lfloor RandomNumber \times MaxTimeSegmet \rfloor$$

where a is number of time slots of the first timing, b is a first constant, RandomNumber is a uniform random number in a range of [0-1], and MaxTimeSegment is a second constant.

4. The device according to claim 3, wherein the MaxTimeSegment is a variable constant.

5. The device according to claim 4,
wherein the MaxTimeSegment is from a first value to a second value, and
wherein the first value is smaller than the second value.

6. The device according to claim 1,
wherein the first frame comprises flag information the second, and
wherein the circuitry is further configured to determine the third timing based on the flag information.

7. A device, comprising:
circuitry configured to:
determine a first timing to transmit a first frame to establish association with a communication terminal in an intra-body communication system,
wherein the first frame comprises a Time Slot (TDS) Number in a frame format based on ECMA-401 standard, and
wherein the first timing corresponds to the TDS Number of the first frame that is TDS0 to TDS3,
transmit the first frame at the first timing;
determine a second frame, for an acknowledgment of the first frame from the communication terminal, is received;
determine a second timing, other than the first timing, to transmit the first frame based on a lack of reception of the second frame,
wherein the second timing corresponds to the TDS Number of the first frame that is TDS4 to TDS7.

8. A method, comprising:
receiving a first frame from a communication terminal in an intra body communication system, wherein the first frame comprises a Time Slot (TDS) Number in a frame format based on ECMA-401 standard;
determining a transmission timing of the first frame is a first timing based on the TDS Number of the first frame that is TDS0 to TDS3;
determining the transmission timing of the first frame is a second timing, other than the first timing, based on the TDS Number of the first frame that is TDS4 to TDS7; and
determining a third timing to transmit a second frame to the communication terminal based on the transmission timing of the first frame.

9. The method according to claim 8, wherein the third timing determined using a random value based on the transmission timing that is the second timing.

10. The method according to claim 9, wherein the third timing (TxTDS) is determined using the random value based on Equation below:

$$TxTDS = a + b \times \lfloor RandomNumber \times MaxTimeSegmet \rfloor$$

where a is a number of time slots of the first timing, b is a first constant, RandomNumber is a uniform random number in a range of [0-1], and MaxTimeSegment is a second constant.

11. The method according to claim 10, wherein the MaxTimeSegment is a variable constant.

12. The method according to claim 11,
wherein the MaxTimeSegment is from first value to a second value, and
wherein the first value is smaller than the second value.

13. The method according to claim 8,
wherein the first frame comprises flag information, and
wherein the third timing is determined based on the flag information.

14. A non-transitory computer-readable medium having stored thereon, computer-readable instructions, which when executed by a computer, cause the computer to execute operations, the operations comprising:
receiving a first frame from a communication terminal in an intra body communication system, wherein the first frame comprises a frame format based on ECMA-401 standard;
determining a transmission timing of the first frame is a first timing based on a Time Slot (TDS) Number in the frame format of the first frame that is TDS0 to TDS3;
determining the transmission timing of the first frame is a second timing, other than the first timing, based on the TDS Number in the frame format of the first frame that is TDS4 to TDS7; and
determining a third timing to transmit a second frame to the communication terminal based on the transmission timing of the first frame.

15. A device, comprising:
circuitry configured to:
receive a first frame from a communication terminal in an intra body communication system,
wherein the first frame comprises a TDS Number in a frame format based on ECMA-401 standard, and
wherein the first frame further comprises flag information;
determine a transmission timing of the first frame is a first timing based on the TDS Number of the first frame that is TDS0 to TDS3;
determine the transmission timing of the first frame is a second timing based on the TDS Number of the first frame that is TDS4 to TDS7; and
determine a third timing to transmit a second frame to the communication terminal based on the flag information and the transmission timing of the first frame.

16. The device according to claim 15, wherein the circuitry is further configured to:
determine the third timing based on the transmission timing of the first frame when the flag information is off; and
determine the third timing based on a random value when the flag information is on.

17. The device according to claim 16, wherein the circuitry is further configured to determine the third timing (TxTDS) by the random value based on Equation below:

$$TxTDS = a + b \times \lfloor RandomNumber \times MaxTimeSegmet \rfloor$$

where a is number of time slots of the first timing, b is a first constant, RandomNumber is a uniform random number in a range of [0-1], and MaxTimeSegment is a second constant.

18. The device according to claim 17, wherein the MaxTimeSegment is a variable constant.

19. The device according to claim 18,
wherein the MaxTimeSegment is from a first value to a second value, and
wherein the first value is smaller than the second value.

20. A method, comprising:
receiving a first frame from a communication terminal in an intra body communication system,
wherein the first frame comprises a (Time Slot) TDS Number in a frame format based on ECMA-401 standard, and
wherein the first frame further comprises flag information;
determining a transmission timing of the first frame is a first timing based on the TDS Number of the first frame that is TDS0 to TDS3;
determining the transmission timing of the first frame is a second timing based on the TDS Number of the first frame that is TDS4 to TDS7; and
determining a third timing to transmit a second frame to the communication terminal based on the flag information and the transmission timing of the first frame.

21. The method according to claim 20,
wherein the third timing is based on the transmission timing of the first frame when the flag information is off; and
wherein the third timing is determined based on a random value when the flag information is on.

22. The method according to claim 21, wherein the third timing (TxTDS) is determined using the random value based on Equation below:

$$TxTDS = a + b \times \lfloor RandomNumber \times MaxTimeSegmet \rfloor$$

where a is a number of time slots of the first timing, b is a first constant, RandomNumber is a uniform random number in a range of [0-1], and MaxTimeSegment is a second constant.

23. The method according to claim 22, wherein the MaxTimeSegment is a variable constant.

24. The method according to claim 23,
wherein the MaxTimeSegment is from a first value to a second value, and
wherein the first value is smaller than the second value.

25. A non-transitory computer-readable medium having stored thereon, computer-readable instructions, which when executed by a computer, cause the computer to execute operations, the operations comprising:
receiving a first frame from a communication terminal in an intra body communication system,
wherein the first frame comprises a Time Slot (TDS) Number in a frame format based on ECMA-401 standard, and
wherein the first frame comprises flag information;
determining a transmission timing of the first frame is a first timing based on the TDS Number of the first frame that is TDS0 to TDS3;
determining the transmission timing of the first frame is a second timing based on the TDS Number of the first frame that is TDS4 to TDS7; and
determining a third timing to transmit a second frame to the communication terminal based on the flag information and the transmission timing of the first frame.

* * * * *